UNITED STATES PATENT OFFICE.

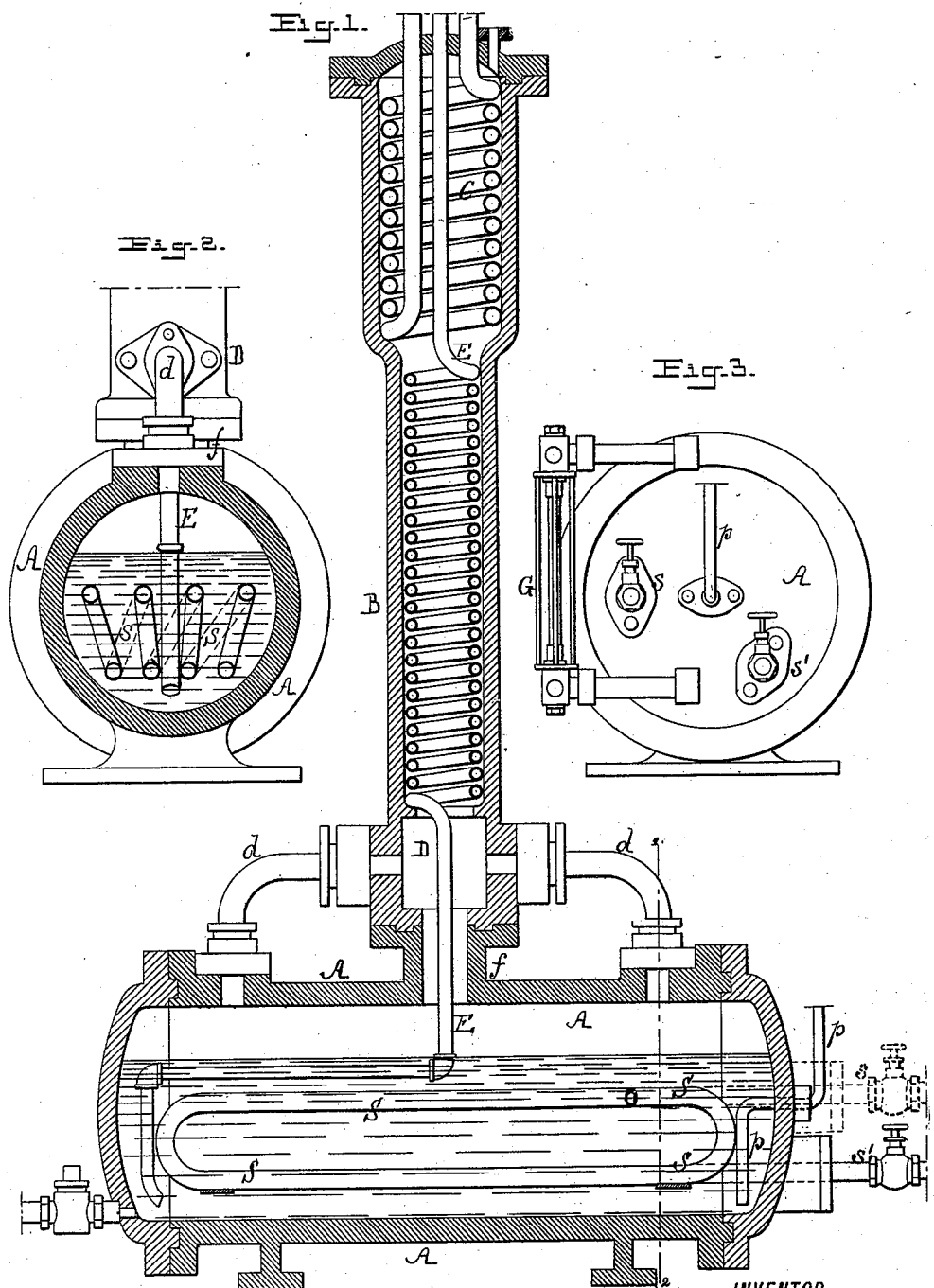

NATHAN W. CONDICT, JR., OF JERSEY CITY, NEW JERSEY.

AMMONIA-STILL.

SPECIFICATION forming part of Letters Patent No. 478,407, dated July 5, 1892.

Application filed December 14, 1889. Serial No. 333,727. (No model.)

*To all whom it may concern:*

Be it known that I, NATHAN W. CONDICT, Jr., a citizen of the United States, and a resident of Jersey City, New Jersey, have invented Improvements in Ammonia-Stills, of which the following is a specification.

My invention relates to that class of stills for refrigerating by the ammonia-absorption process in which the heat is applied by means of steam or other heating pipes or coils in the body of liquid ammonia contained in the still.

The object of my invention is to so construct the still that the temperature will not under ordinary conditions rise to a point where the water will be vaporized, but yet it will be sufficiently high for the generation of the ammoniacal gas. The gas will thus be produced in a condition as nearly anhydrous as possible, and it becomes unnecessary to employ means for depriving the gas of its moisture after it leaves the still.

In the accompanying drawings, Figure 1 is a vertical section of a still embodying my invention. Fig. 2 is a transverse section of the still on the line 1 2, Fig. 1. Fig. 3 is an end view of the still, showing the inlets and outlets for the heating-coils.

The still illustrated in the drawings is in the form of a single horizontal cylinder of sufficient capacity; but it should be understood at the outset that my invention may be applied to various forms and constructions of still, and that it is immaterial whether there be only one or more than one distilling-chamber. In the present instance there is shown as supported upon the still A a reservoir D, which receives the gas on its way to the rectifier or heat-interchanging vessel B through the passages $d$, forming communication between the ends of the cylindrical still and the ends of this reservior. The latter is also in communication with the still through the hollow leg $f$, which supports the reservoir. The vessel B is supported in turn upon the reservoir and may be of any convenient construction. All this is set forth in and forms the subject of my patent, No. 402,809, dated May 7, 1889. The pipe E, which supplies the liquid ammonia from the absorber to the still, is coiled within the vessel B, as shown in Fig. 1, and the lower end of the pipe passes down through the reservoir and leg $f$ into the still near one end below the heating-coils. From the opposite end of the retort, also at the bottom, leads an outlet-pipe $p$ for the discharge of the weak water. It will be understood that the supply-pipe E for the strong ammonia from the absorber does not open into the vessel B, but is simply passed through this vessel in the form of a coil, as has heretofore been done. I have shown a cold-water coil C on the upper part of the vessel B for the further cooling of the gas when it rises upward.

G is the gage to indicate the level of the liquid in the retort.

S are the steam or other heating pipes or coils, with the admission end $s$ and the discharge end $s'$ passing out through the end of the retort, as shown in Figs. 1 and 3.

I find that too great an amount of heat in the still increases the tendency to a saturation of the gas with aqueous vapor. In many cases this is due to the keeping up of such a high temperature as to vaporize the water as well as the ammoniacal liquor; but even where the temperature is not so high as to theoretically be capable of vaporizing the water under the still-pressure, yet considerable aqueous vapor will be carried off with the gas.

For practical purposes I have discovered that where steam at an ordinary boiler-pressure is supplied to the heating pipes or coils the tendency of the gas to carry off moisture with it is reduced to a minimum by proportioning the acting heating-surface of the coils or pipes to the normal space allowed for the liquor, so that there shall be about one cubic foot of the normal quantity of ammoniacal liquor to about two to three square feet of active heating-surface. The coils, as represented in the drawings, are so proportioned.

I have in practice with a single-cylinder retort constructed as described and with steam supplied to the coils or pipes at a temperature of about 300° Fahrenheit obtained excellent results with the ammoniacal liquor at 22° Baumé, maintaining a temperature of 205° to 207° Fahrenheit. With a liquor of, say, 26° Baumé I can maintain the still-temperature as low as 180° to 190° Fahrenheit.

An important practical advantage of the construction of a still with the proportion of heating-surface described is that an unskilled workman cannot make it work badly. In operating the ordinary ammonia-absorption apparatus for refrigerating the natural supposition of the workman is that if he is not getting sufficient cold in his freezing-tanks he needs to generate more ammonia in the still, and for that purpose all that is necessary is to turn on more steam. The result is in an ordinary apparatus that he generates more aqueous moisture, which is carried off with the gas, and his apparatus works worse than it did before. In my apparatus with the described proportion of heating-surface the workman can turn on a full head of steam at the ordinary boiler-pressure without interfering with the production of a practically anhydrous gas.

I claim as my invention—

In an apparatus for refrigerating by the ammonia-absorption process, the combination of a still with heating-coils therein, having an active heating-surface of from two to three square feet to about one cubic foot of the normal liquor-space in the still, substantially as described.

In testimony whereof I have signed my name to this specification in the presence of two subscribing witnesses.

NATHAN W. CONDICT, JR.

Witnesses:
JAMES R. TORRANCE,
HUBERT HOWSON.